Nov. 24, 1953     G. A. LYON     2,660,479
WHEEL COVER
Filed March 11, 1952     2 Sheets-Sheet 2
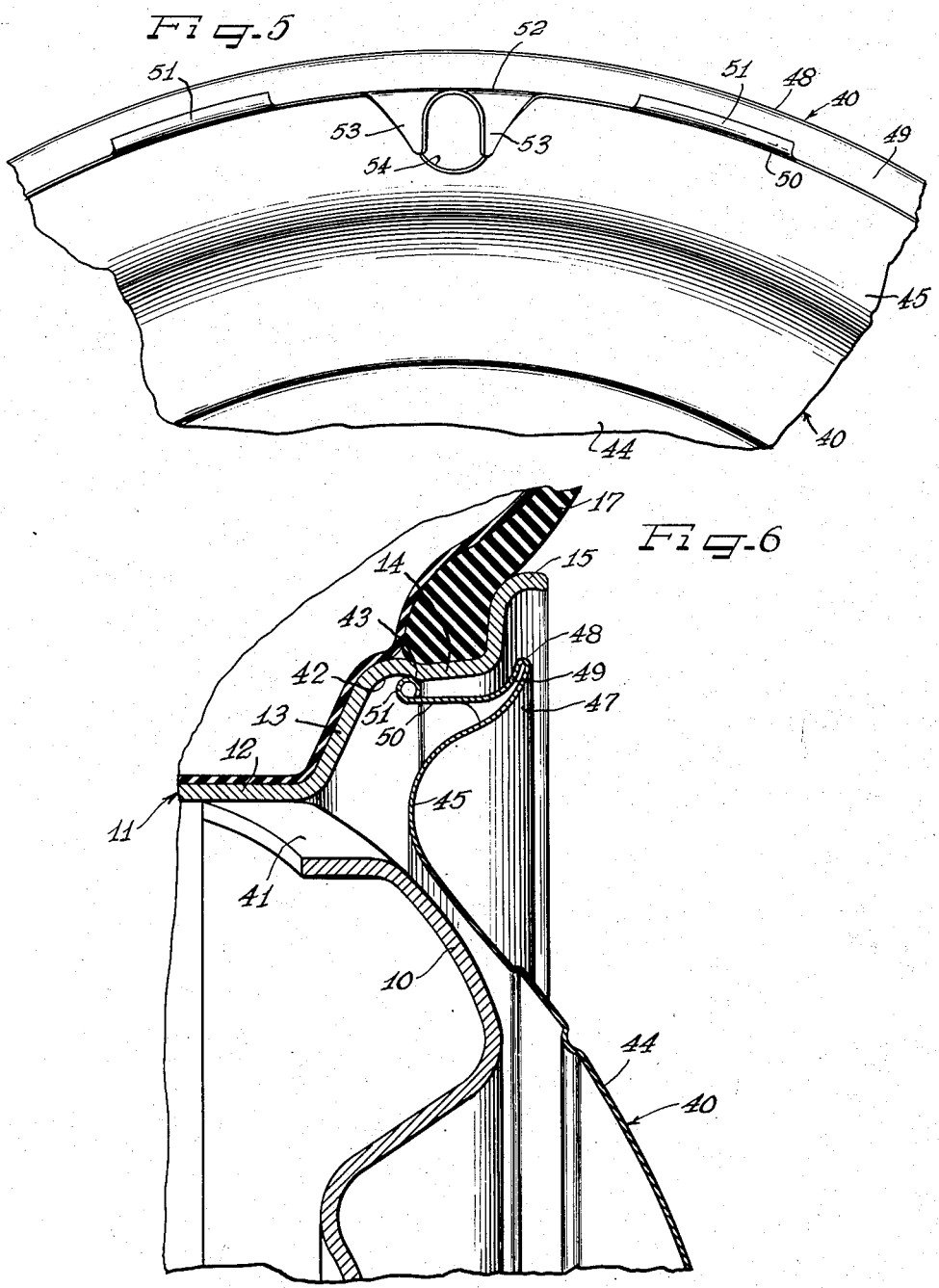
Inventor
GEORGE ALBERT LYON Patented Nov. 24, 1953

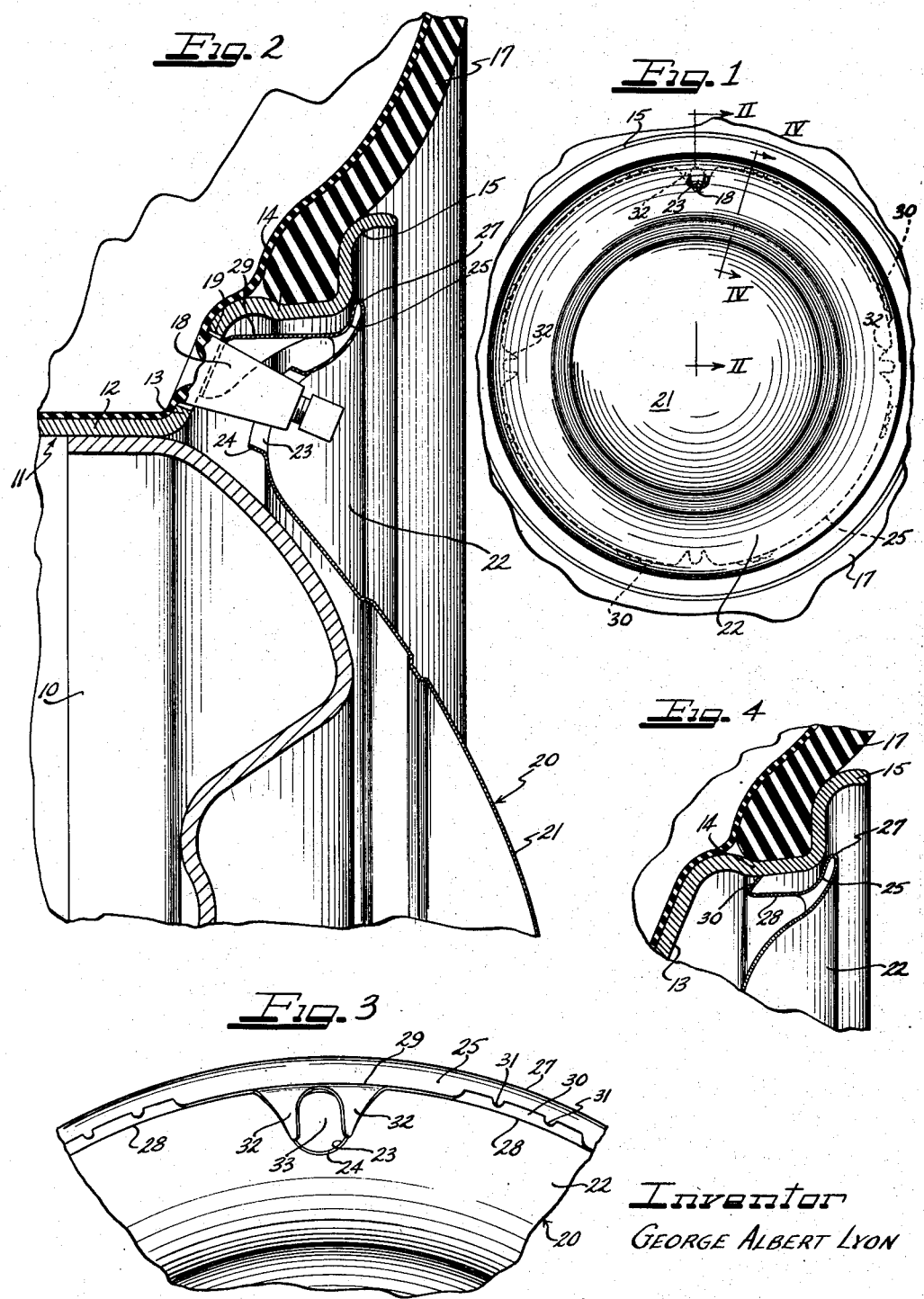

2,660,479

UNITED STATES PATENT OFFICE 2,660,479

WHEEL COVER

George Albert Lyon, Detroit, Mich.

Application March 11, 1952, Serial No. 275,873

12 Claims. (Cl. 301—37)

The present invention relates to improvements in wheel structures and more particularly concerns improvements in the ornamental and protective covering of the outer sides of vehicle wheels such as the wheels of automobiles.

An important object of the present invention is to provide an improved wheel structure in which the outer side of the wheel is covered by a novel self-retaining, self-centering, non-turning wheel cover.

Another object of the invention is to provide an improved cover for the outer side of a vehicle wheel and in which the outer margin of the cover is formed with improved means for retaining the cover on the wheel and in a non-tilting, non-turning, centered position on the wheel.

A further object of the invention is to provide an improved one piece cover for the outer side of a vehicle wheel.

Still another object of the invention is to provide improved means in a wheel cover for retaining the cover on a wheel.

According to the general features of the invention there is provided in a wheel structure including a load sustaining wheel body and a multi-flanged tire rim having a side flange through which there is an aperture for protrusion therethrough of the valve stem of a pneumatic tube and tire assembly, a cover for the outer side of the wheel including a margin for substantial concealing disposition opposite the tire rim and having an underturned marginal flange including a plurality of tire rim engaging retaining fingers extending generally radially outwardly and engageable against a flange of the tire rim axially outwardly of the side flange, said underturned cover margin having a plurality of axially inwardly extending portions bottoming against the tire rim side flange and each including a pair of generally radially inwardly extending reinforcing and springy wire flanges.

According to the other general features of the invention there is provided in a cover for disposition at the outer side of a vehicle wheel, a cover member having a circular outer margin including an underturned flange, said flange having generally axially inwardly extending portions thereon including generally radially and axially outwardly turned retaining fingers for retaining engagement with an intermediate flange of a wheel, and axially inward extensions projecting to a distance enabling the same to engage against a side flange of the tire rim, each of said extensions including a pair of generally radially inwardly extending resilient wing flanges cooperable with the tire rim side flange to maintain the retaining fingers under retaining tension in assembly.

According to yet other general features of the invention the cover margin has a valve stem aperture aligned with the space between a pair of the wing flanges and such wing flanges are adapted to engage at opposite sides of a valve stem.

Other objects, features and advantages of the present invention will be readily apparent from the following detailed description of a preferred embodiment thereof taken in conjunction with the accompanying drawings, in which:

Figure 1 is a side elevational view of a vehicle wheel structure embodying features of the present invention;

Figure 2 is a fragmentary radial sectional view taken on an enlarged scale and substantially on the line II—II of Figure 1;

Figure 3 is a fragmentary rear elevational view of the vehicle wheel cover;

Figure 4 is a fragmentary radial sectional detail view taken substantially on the line IV—IV of Figure 1;

Figure 5 is a fragmentary rear elevational view of a modified form of the wheel cover; and Figure 6 is a fragmentary radial sectional view, similar to Figure 4, but showing the modified form of Figure 5 as applied to the wheel.

As shown on the drawings:

A vehicle wheel with which the present invention is adapted to be employed comprises a wheel body 10 and a tire rim 11 both of which are adapted to be made from suitable gauge sheet metal, the body portion being stamped to form and the tire rim portion being rolled to desired shape. The wheel body is marginally secured in any preferred manner to a base flange 12 on the tire rim. From the base flange the outer side of the tire rim extends as a side flange 13, an intermediate flange 14 and a terminal flange 15, to provide a multi-flange structure adapted to support a pneumatic tire and tube assembly 17. For inflating the tire the tube has a valve stem 18 which projects through an appropriate aperture 19 in the side flange 13 of the tire rim.

For covering the outer side of the wheel ornamentally and protectively, a cover 20 (Figs. 1 to 4) is provided which as shown comprises a full disk type of cover which substantially covers the outer side of the wheel including the entire wheel body 10 and substantially the outer side of the tire rim 11. For this purpose the wheel cover 20 is preferably made from sheet material such as sheet steel or stainless steel of appropriate gauge and is formed with a crown portion 21 generally simulating a hub cap but being of a crown diameter to substantially cover the entire wheel body 10. Merging on a concave radius with the perimeter of the crown portion 21 is a trim ring portion 22 integral in one piece therewith. By preference the trim ring portion 22 is of generally convex cross section and in the present instance has the outer marginal extremity thereof extending to substantially overlie the inner portion of the terminal flange 15. For passage of the valve stem 18, the trim ring portion 22 is formed with a valve stem aperture 23 which is reinforced and finished by means of an inwardly extending reinforcing flange 24.

Improved means are provided on the cover 20 for self-retention on the wheel and also for maintaining the cover in centered, non-tilting, non-turning, non-rattling assembly with the wheel. To this end, the outer marginal extremity of the trim ring portion 22 is turned under to provide a marginal reinforcing and tire rim clearing flange 25 which joins the body of the cover on a small radius bead-like turned marginal reinforcing extremity or edge 27. The underturned flange 25 extends generally radially inwardly to an extent sufficient to clear the inner margin of the flange radially inwardly of the tire rim intermediate flange 14.

At its inner extremity, the underturned flange 25 is turned generally axially inwardly and is provided with an annular series of cover retaining extensions 28 and cover centering extensions 29. By preference the extensions are formed with a pair of the cover extensions flanking one of the centering extensions 29 at four equally spaced locations about the cover. As best seen in Figs. 1 and 3, each pair of retaining extensions, while reasonably close together, is sufficiently spaced to afford adequate clearance for one of the centering extensions 29.

The retaining extensions 28 are disposed on a circle of smaller diameter than the inner face of the tire rim intermediate flange 14. Actual retaining engagement with the tire rim intermediate flange is effected by a generally radially and axially outwardly turned retaining finger extremity 30 which is relatively short and stiff so as to enter into gripping, wedging, generally biting retaining engagement with the opposing face of the tire rim intermediate flange 14, the inherent resiliency of the retaining extension 28 being relied upon to maintain the grip of the finger 30. Prior to assembly with the wheel, the retaining extensions 28 extend to a somewhat greater diameter and thereby the tip of the retaining finger extremity 30 also extends to a greater diameter than the inner diameter of the tire rim intermediate flange 14. When the cover 20 is assembled with the wheel and inward pressure applied thereto, the retaining finger terminal portions 30 cam inwardly along the tire rim intermediate flange and as the cover moves inwardly the terminals 30 are gradually forced radially inwardly and retaining finger extensions 28 are progressively flexed to increase the retaining grip of the finger extensions on the tire rim. Resiliency of the finger extensions 28 is enhanced by the transverse curvature thereof.

Each of the finger terminals 30 is preferably divided by a series of equally spaced notches 31 (Fig. 2) into a plurality of sections to enhance the retaining gripping quality thereof and enable self-adjustment of the retaining finger extremities to possible inaccuracies in the surface of the tire rim intermediate flange.

A predetermined spaced relationship of the underturned flange 25 to the terminal flange 15 of the tire rim and more particularly the portion of the terminal flange adjacent juncture with the intermediate flange 14 is maintained by engagement of the centering extensions 29 with the side flange 13 of the tire rim. To this end, each of the centering extensions 29 is of greater length than the retaining finger extensions 28 and is arranged to bottom against the side flange 13, being provided for this purpose with a pair of spaced generally radially inwardly extending wing flanges 32. The axially inner edges defining the wing flanges are preferably disposed in approximately the plane of the tire rim side flange 13, but with the wing flanges preferably initially slightly biased axially inwardly toward the inner ends thereof so that when the cover is being mounted on the wheel, axially inward pressure against the cover to fully assemble the wheel will effect tensioning of the wing flanges 32 against the tire rim side flange 13, and the tensioned force thus created will react axially outwardly and will enhance the retaining grip of the retaining finger extensions 30 on the tire rim intermediate flange 14. As best seen in Figs. 2 and 3, the wing flanges 32 are formed to compound curvature generally divergently and their proximate edges define a clearance therebetween.

By preference the spacing 33 between one of the pairs of wing flanges 32 is aligned with the valve stem aperture 23 in the cover. Moreover, the valve stem accommodating spacing 33 is so dimensioned that in full assembly with the wheel, the proximate edges of the wing flanges 32 will engage the base of the valve stem 18 and thus effectively hold the cover against turning on the wheel.

It will be apparent that since the centering extensions 29 are equidistantly spaced and since they are of equal length, they will retain the cover uniformly with the marginal flange 25 spaced from the tire rim therebehind and will prevent canting of the cover. The wing flanges 32 of the center extension that engages the valve stem assures that the cover will be properly centered with respect to the valve stems and also assures that the cover will not turn in service. These are advantages in addition to the advantage of springiness or resilience acting to enhance the retaining characteristics of the retaining finger terminals 30.

Mounting of the cover on the wheel, is, of course, a simple matter of pushing the cover axially inward into position on the wheel until the wing flanges 32 of the centering extensions 28 have firmly bottomed on the side flange 13.

Removal of the cover can be effected conveniently by applying a pry-off tool such as a screwdriver or the like between the reinforced edge 27 of the cover and the tire rim and prying the cover free, the resilient character of the retaining extensions 28 permitting the same to yield sufficiently for this purpose. In addition, it will be observed that the retaining extensions 28 are sufficiently separated from the adjacent centering extension 29 to avoid interference by the centering extension with the resilience of the retaining finger extensions.

In the modification of Figures 5 and 6, a wheel cover 40 is provided which is essentially the same as the cover 20 but has different means for retaining engagement with the wheel. Since the wheel structure is substantially the same as the wheel as shown in Figures 2 and 4, similar reference numerals designate similar parts and the general description of the wheel will not be repeated here. However, it should be noted that the wheel has ventilation openings 41 at the outer periphery of the wheel body 10 and that the tire rim has at the base of the intermediate flange 14, where the latter joins the side flange 13 of the tire rim, an annular generally radially inwardly opening groove 42 defined at its axially outer side by a generally radially and axially inwardly directed shoulder 43.

The cover 40 may comprise a full disk type of cover made from appropriate gauge sheet metal such as stainless steel suitably finished as by polishing to a high luster on its outer surface. The cover comprises a central axially outwardly bulging crown portion 44 merging with a transversely dished annular portion 45 which in turn converges with a generally radially and axially outwardly directed convexly shaped marginal portion 47. The latter is of smaller diameter than the extremity portion of the terminal flange 15 of the tire rim, but of an extent to at least partially overlie the inner portion of the terminal flange structure. At its extremity, the marginal portion 47 is turned under upon itself to provide a rounded, bead-like reinforcing edge 48.

In the present instance means for retaining the cover in place on the wheel comprise structure for snap-on pry-off engagement with the shoulder 43 of the tire rim, and means for bottoming against the side flange 13 of the tire rim to retain the cover in a predetermined axially inward position. To this end, the cover margin has an underturned generally radially and axially inwardly extending flange 49 from the inner edge of which project generally axially inwardly resiliently flexible retaining fingers 50 provided with radially and axially outturned rounded stiffening, tire rim engaging terminal beads 51. These terminal beads 51 are of substantial width and are preferably outwardly bowed or curved conformable to the perimeter of the cover and are thus highly resistant to deformation. The diameter on which the fingers are disposed is somewhat less than the inner diameter of the intermediate flange 14 of the tire rim, but the finger terminals 51 project radially outwardly to a larger diameter than the fingers and are adapted to engage retainingly behind the tire rim shoulder 43 under substantial tension as imposed by the resilient radially deflectable retaining fingers 50.

For maintaining the cover in predetermined inward position on the wheel, the flange 49 is provided at preferred intervals, such for example as discussed in connection with the cover of Figure 1 with axially inwardly directed spacer elements or fingers 52 each of which is preferably provided with a spaced pair of radially inwardly directed more or less resilient foot flanges 53 comprising integral extensions in one piece from the body portions of the fingers. As will be observed in Figure 5, the spacing between the flanges 53 is preferably such as to be adapted for accommodating therebetween the base portion of a valve stem which is adapted to project through a valve stem aperture 54 in the body portion 45 of the cover. The stop elements or fingers 52 are preferably of a length to bottom against the side flange 13 of the tire rim when the retaining finger terminals 51 are in retaining engagement behind the tire rim shoulder 43. The cover is thereby uniformly held in axially outwardly spaced relation to the wheel body 10 and the tire rim 11 except for the engagement of the tire rim by the finger terminals 51 and the foot flanges 53.

As best seen in Fig. 6, the axial placement of the cover is such that a substantial gap persists between the outer margin of the cover and the tire rim, that is behind the underturned flange 49 of the cover and the engaged portion of the tire rim so that air circulation is enabled between the margin of the cover and the wheel therebehind and through the ventilation openings 41 in the wheel.

It will be understood that modifications and variations may be effected without departing from the scope of the novel concepts of the present invention.

This application is continuation-in-part of my application Serial No. 110,100, filed August 13, 1949, abandoned in favor of this application.

I claim as my invention:

1. In a wheel structure including a load sustaining wheel body and a multi-flanged tire rim in which the tire rim has a side flange through which there is an aperture for protrusion therethrough of the valve stem of a pneumatic tube and tire assembly, a cover for the outer side of the wheel including a margin for substantial concealing disposition opposite the tire rim and having an underturned marginal flange including a plurality of tire rim engaging retaining fingers extending generally radially outwardly and engageable against a flange of the tire rim axially outwardly of the side flange, said underturned cover margin having a plurality of axially inwardly extending portions bottoming against the tire rim side flange and each including a pair of generally radially inwardly extending reinforcing and spring wing flanges.

2. In a cover for disposition at the outer side of a vehicle wheel, a cover member having a circular outer margin including an underturned flange, said flange having generally axially inwardly extending portions thereon including generally radially and axially outwardly turned retaining fingers for retaining engagement with an intermediate flange of a tire rim, and axially inward extensions projecting to a distance enabling the same to engage against a side flange of the tire rim, each of said extensions including a pair of generally radially inwardly extending resilient wing flanges cooperable with the tire rim side flange to maintain the retaining fingers under retaining tension in assembly.

3. In a cover for disposition at the outer side of a vehicle wheel, a cover member having a circular outer margin including an underturned flange, said flange having generally axially inwardly extending portions thereon including generally radially and axially outwardly turned retaining fingers for retaining engagement with an intermediate flange of a tire rim, and axially inward extensions projecting to a distance enabling the same to engage against a side flange of the tire rim, each of said extensions including a pair of generally radially inwardly extending resilient wing flanges cooperable with the tire rim side flange to maintain the retaining fingers under retaining tension in assembly, the cover margin having a valve stem aperture aligned with the space between a pair of the wing flanges and such wing flanges being adapted to engage at opposite sides of a valve stem.

4. In a wheel structure including a wheel body and a multi-flanged tire rim wherein the tire rim has a side flange and an intermediate flange, a cover for the outer side of the wheel including a marginal portion having an underturned generally radially inwardly extending flange with the inner margin of the flange extending generally axially inwardly, said underturned flange having a series of inwardly extending retaining finger portions having retaining finger terminal flanges extending into retaining engagement with the tire rim intermediate flange, and a series of generally axially inwardly extending extensions on said flange margin bearing against the tire rim side flange and maintaining the underturned flange in spaced relation to the tire rim.

5. In a wheel structure including a wheel body and a multi-flanged tire rim wherein the tire rim has a side flange and an intermediate flange, a cover for the outer side of the wheel including a marginal portion having an underturned generally radially inwardly extending flange with the inner margin of the flange extending generally axially inwardly, said underturned flange having a series of inwardly extending retaining finger portions having retaining finger terminal flanges extending into retaining engagement with the tire rim intermediate flange, and a series of generally axially inwardly extending extensions on said flange margin bearing against the tire rim side flange and maintaining the underturned flange in spaced relation to the tire rim, one of said spacer extensions having a pair of generally radially inwardly extending flanges defining a valve stem clearing opening therebetween.

6. In a cover for disposition at the outer side of a vehicle wheel, a cover body having a marginal underturned flange, said flange having spaced retaining fingers each including a terminal portion projecting generally radially outwardly for engaging with a tire rim of a wheel for retaining the cover against axially outward displacement, and a plurality of generally axially inward extensions from said flange spaced from said retaining fingers and projecting axially inwardly therebeyond for bottoming against a portion of a tire rim to retain the cover in a predetermined axially inward position, said cover body and flange and extensions all being formed in one piece of sheet material.

7. In a cover for disposition at the outer side of a vehicle wheel including a tire rim having base and intermediate flanges, a cover member provided with a retaining structure at the margin thereof including a flange extending generally radially inwardly and then axially inwardly in concealed relation behind the margin of the cover, said flange having a plurality of spaced inwardly extending retaining finger portions each of which has a retaining flange terminal extending generally radially and axially outwardly for wedging retaining engagement with the tire rim intermediate flange, each of said retaining finger flanges being separated into a plurality of individual sections, and a cover centering and spacing extension extending generally axially inwardly between retaining finger extensions and engageable with the tire rim side flange.

8. In a cover for disposition at the outer side of a vehicle wheel including a tire rim having base and intermediate flanges, a cover member having a retaining structure at the margin thereof including a flange extending generally radially inwardly and then axially inwardly in concealed relation behind the margin of the cover, said flange having a plurality of spaced pairs of inwardly extending retaining finger portions each of which has a retaining flange terminal extending generally radially and axially outwardly for wedging retaining engagement with the tire rim intermediate flange, each of said retaining finger flanges being separated into a plurality of individual sections, and a cover centering and spacing extension extending generally axially inwardly between each pair of retaining finger extensions and engageable with the tire rim side flange, said spacing and centering extensions each comprising a pair of generally radially inwardly extending flanges engageable with the tire rim side flange.

9. In a cover for disposition at the outer side of a vehicle wheel including a multi-flanged tire rim having a side flange and an intermediate flange, a cover member having a marginal concealed structure for retention and centering of the cover on the wheel, said structure including a spaced pair of generally axially inward resilient extensions having radially outwardly extending retaining finger flanges, and a centering and spacing extension extending inwardly between said retaining extension, said spacing and centering extension having a pair of generally radially inwardly extending flanges, the cover having a valve aperture aligned with the space between said flanges for receiving a valve stem.

10. In a wheel structure including a wheel body and a multi-flanged tire rim, the tire rim comprising a generally radial outer side flange merging with a generally axially extending intermediate flange and the latter flange merging with a terminal flange, the side flange having a valve stem aperture, a circular cover for the outer side of the wheel and extending into substantially concealing relation to the outer side of the tire rim, the cover having an integral underturned outer marginal flange extending generally radially inwardly and axially inwardly clear of the tire rim flanges, retaining means on said flange comprising a plurality of generally axially inwardly extending tire rim engaging retaining fingers each of which has a generally radially outturned flange terminal for generally wedging retaining engagement with the tire rim intermediate flange, and a plurality of generally axially inwardly extending centering and spacing extensions annularly spaced and extending from said flange intermediate said retaining extensions, said extensions bearing against the tire rim side flange, one of said extensions and the cover margin opposite the same having aligned openings for projection therethrough of the valve stem, said one centering extension engaging about the base of the valve stem to retain the cover against turning on the wheel.

11. In a wheel structure including a wheel body and a multi-flanged tire rim, wherein the tire rim has a side flange and an intermediate generally axially outwardly extending flange provided with a radially inwardly opening groove defined at its axially outer side by a generally axially and radially inwardly facing shoulder, a cover for the outer side of the wheel comprising a cover body having at its outer margin a continuous underturned marginal flange having as integral extensions therefrom retaining fingers provided with stiff terminals retainingly engageable behind the tire rim shoulder, and other extensions spaced from said retaining extensions engageable with the side flange of the tire rim for maintaining the cover in the predetermined axially inward position.

12. In a wheel structure including a wheel body and a multi-flanged tire rim, wherein the tire rim has a side flange and an intermediate generally axially outwardly extending flange provided with a radially inwardly opening groove defined at its axially outer side by a generally axially and radially inwardly facing shoulder, a cover for the outer side of the wheel comprising a cover body having at its outer margin a continuous underturned marginal flange having as integral extensions therefrom retaining fingers provided with stiff terminals retainingly engageable behind the tire rim shoulder, and other extensions spaced from said retaining extensions engageable with the side flange of the tire rim for maintaining the cover in the predetermined axially inward position, said tire rim side flange engaging extensions being of a length to maintain the outer margin of the cover in spaced relation to the tire rim so that air circulation is enabled behind the margin of the cover and through ventilation openings in the wheel.

GEORGE ALBERT LYON.

References Cited in the file of this patent

UNITED STATES PATENTS

| Number | Name | Date |
| --- | --- | --- |
| 2,551,327 | Horn | May 1, 1951 |